(12) United States Patent
Hutchin

(10) Patent No.: US 7,400,448 B2
(45) Date of Patent: Jul. 15, 2008

(54) BIREFRINGENT SPECTRAL FILTER

(75) Inventor: Richard A. Hutchin, Woodland Hills, CA (US)

(73) Assignee: Optical Physics Company, Calabasas, CA (US)

( * ) Notice: Subject to any disclaimer, the term of this patent is extended or adjusted under 35 U.S.C. 154(b) by 198 days.

(21) Appl. No.: 11/216,273

(22) Filed: Aug. 30, 2005

(65) Prior Publication Data

US 2006/0109551 A1 May 25, 2006

Related U.S. Application Data

(60) Provisional application No. 60/629,874, filed on Nov. 19, 2004.

(51) Int. Cl.
*G02B 27/28* (2006.01)

(52) U.S. Cl. .................. 359/494; 359/495; 359/497

(58) Field of Classification Search .................. None
See application file for complete search history.

(56) References Cited

U.S. PATENT DOCUMENTS

| | | | | |
|---|---|---|---|---|
| 6,580,509 B1 | | 6/2003 | Hutchin et al. ............. 356/451 |
| 6,700,855 B2 * | | 3/2004 | Horie ..................... 369/112.21 |
| 6,882,384 B1 * | | 4/2005 | Sharp ......................... 349/78 |
| 7,116,480 B1 * | | 10/2006 | Li ............................. 359/495 |

OTHER PUBLICATIONS

Hawthorne et al., "A Tunable Lyot Filter at Prime Focus: A Method for Tracing Supercluster Scales at z ~ 1", *The Astrophysical Journal*, vol. 563, pp. 611-628 (2001).

*Remote Sensing By Fourier Transform Spectrometry* by Reinhard Beer, vol. 120 in Chemical analysis, J. D. Winefordner, pp. 15-127, 1992.

*Imaging Spectrometry III*, Proceedings of SPIE—The International Society for Optical Engineering, Michael R. Descour, Sylvia S. Shen, Jul. 28-30, 1997, San Diego, California, vol. 3118, pp. 14-22.

*Performance trade-offs of infared spectral imagers*, J.N. Cederquist and C.R. Schwartz, ERIM International, Inc., Ann Arbor, MI, SPIE vol. 3118, pp. 23-27, 1997.

*Thermal Imagery Spectral Analysis*, Brian H. Collins, Richard C. Olsen, John Hackwell, SPIE vol. 3118, pp. 94-105, 1997.

*Updated results from performance characterization and calibration of the TRWIS III hyperspectral imager*, Mark A. Folkman, Stephanie Sandor, Sveinn Thordarson, Ted Hedman, Darrell Gleichauf, Suzanne Casement, Bill Quon, and Peter Jarecke, TRW Space & Electronics Group, Redondo Beach, CA, SPIE vol 3118, pp. 142-153, 1997.

(Continued)

*Primary Examiner*—Stephone B. Allen
*Assistant Examiner*—Lee Fineman
(74) *Attorney, Agent, or Firm*—Connolly Bove Lodge & Hutz LLP

(57) ABSTRACT

A birefringent spectral filter comprises a first birefringent stage and a polarizing beam splitter optically coupled to the first birefringent stage. The first birefringent stage is adapted to generate an optical path difference between light propagating along each of two orthogonal axes. This configuration is most advantageous when light incident on the first birefringent stage is polarized at 45° relative to the extraordinary axis of the birefringent material. The first birefringent stage may advantageously include a first and second layers of birefringent material and a half-wave plate disposed therebetween. Preferably, the first and second layers of birefringent material have orthogonally aligned extraordinary axes.

34 Claims, 6 Drawing Sheets

OTHER PUBLICATIONS

*High-speed imaging sprectrometry,* Curtis E. Volin, Michael R. Descour, Eustace L. Dereniak, Optical Sciences Center, Tucson, AZ, SPIE vol. 3118, pp. 179-183, 1997.

*New Approach to Imaging Spectroscopy Using Diffractive Optics,* Michele Hinnrichs, Mark Massie, Pacific Advanced Technology, Santa Ynez, CA, SPIE vol. 3118, pp. 194-205, 1997.

*Quantitative assessment of hyperspectral sensor detection performance,* Anthony Sommese, Bruce Shetler and Frank P. Billingsley, Photon research Associates, NY, CA & VA, SPIE vol. 3118, pp. 308-321, 1997.

*Imaging spectrometers using concentric optics,* D R Lobb, Sira Ltd, Kent, UK, SPIE vol. 3118, pp. 339-347, 1997.

* cited by examiner

BIREFRINGENT SPECTRAL FILTER

PRIORITY

Priority is claimed to U.S. Provisional Application No. 60/629,874, filed on Nov. 19, 2004, the disclosure of which is incorporated herein by reference.

BACKGROUND OF THE INVENTION

1. Field of the Invention

The field of the present invention is spectral filters, and particularly to those spectral filters that employ birefringence to generate an optical path difference in incident light.

2. Background

A hyper-spectral sensor is disclosed in U.S. Pat. No. 6,580,509 to Hutchin, the disclosure of which is incorporated herein by reference. This hyper-spectral filter, while effective in separating bands of light, can be too bulky and heavy for certain applications. Other hyper-spectral sensors generally suffer from the same shortcoming.

SUMMARY OF THE INVENTION

The present invention is directed toward a birefringent spectral filter. A birefringent stage and a polarizing beam splitter, which is optically coupled to the birefringent stage, are included in the filter. The birefringent stage generates an optical path difference (OPD) between light propagating along each of two orthogonal axes. The polarizing beam splitter divides light emerging from the birefringent stage into two beams which are orthogonally polarized.

In a first separate aspect of the present invention, the birefringent stage comprises two layers of a birefringent material with a half-wave plate disposed therebetween. Each layer of the birefringent material may have its extraordinary axis orthogonally aligned with the extraordinary axis of the other layer. Further, the two layers of the birefringent material may have substantially identical depths. This geometry renders the OPD nearly independent of the azimuthal angle of light incident upon the filter.

In a second separate aspect of the present invention, the filter comprises two or more birefringent stages. Each of the birefringent stages includes two layers of a birefringent material, which may be a different birefringent material used in other stages. A half-wave plate is disposed between the two layers of the birefringent material. Each layer of the birefringent material may have its extraordinary axis orthogonally aligned with the extraordinary axis of the other layer, and these two layers may also have substantially identical depths. This configuration renders the OPD independent of the sine of the angle of incidence upon the filter, $\theta$, at least through the second order.

In a third separate aspect of the present invention, the half wave plates used in multiple stages may be replaced with a single half-wave plate in the middle of the filter with one layer of each stage before and one layer of each stage after the half-wave plate. Such a configuration will have essentially the same performance as a design using multiple half-wave plates.

In a fourth separate aspect of the present invention, the birefringent stage comprises a pair of wedge-shaped layers of birefringent material. Each wedge-shaped layer is movable in a direction which is approximately perpendicular to the optical axis of the birefringent stage. In addition, the birefringent stage may also comprise a half-wave plate that is formed from a pair of wedge-shaped layers. Like the birefringent material, each wedge-shaped layer may movable in a direction which is perpendicular to the optical axis of the birefringent stage.

In a fifth separate aspect of the present invention, any of the previous aspects may be used in combination.

Accordingly, the present invention provides an improved birefringent spectral filter. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
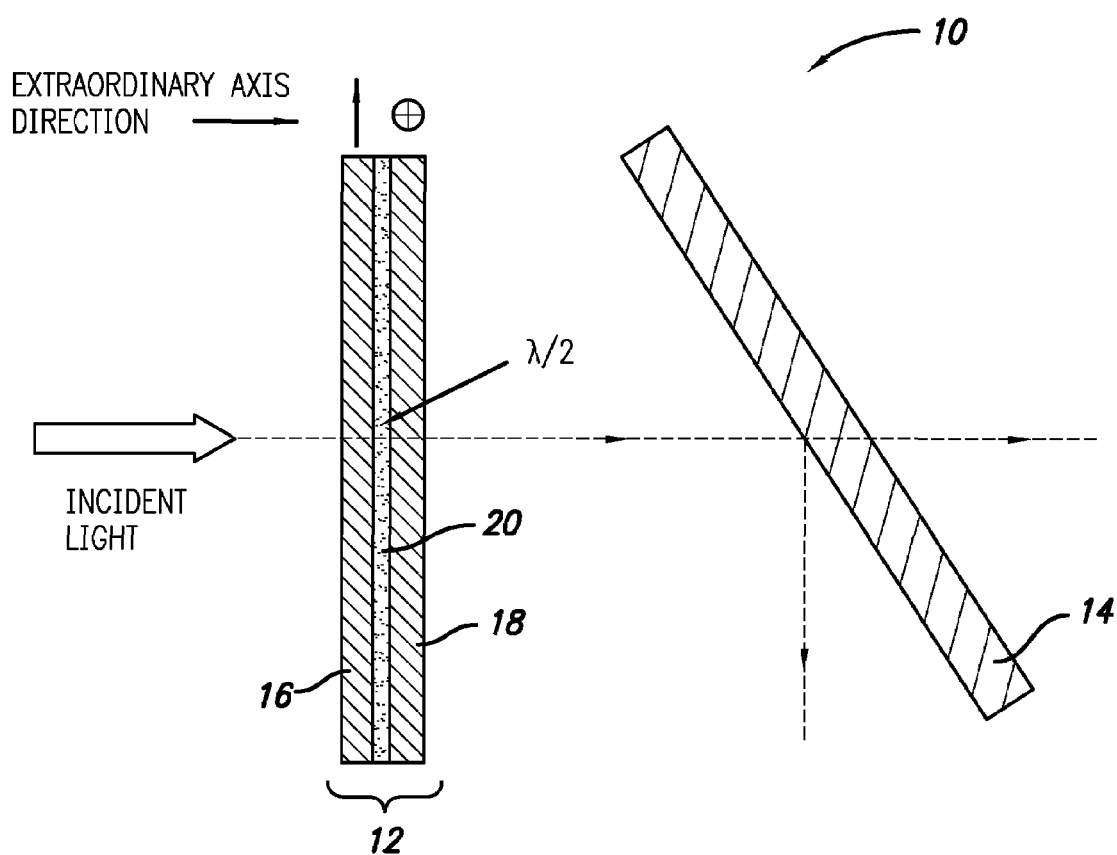
FIG. 1 illustrates a filter with a single birefringent stage.

Turning in detail to the drawings, FIG. 1 illustrates a birefringent filter 10 having a single birefringent stage 12 and a polarizing beam splitter 14, each being optically coupled to the other. The birefringent stage 12 includes two layers 16, 18 of appropriate birefringent material, preferably the same material, separated by a half wave plate 20. The first layer 16 of birefringent material has its extraordinary axis orthogonally aligned with the extraordinary axis of the second layer 18 of birefringent material. The polarizing beam splitter 14 polarizes light that passes through the birefringent stage 12, with light passing through the polarizing beam splitter 14 having a polarization that is orthogonal to light reflecting off the polarizing beam splitter 14.

Figure 2:
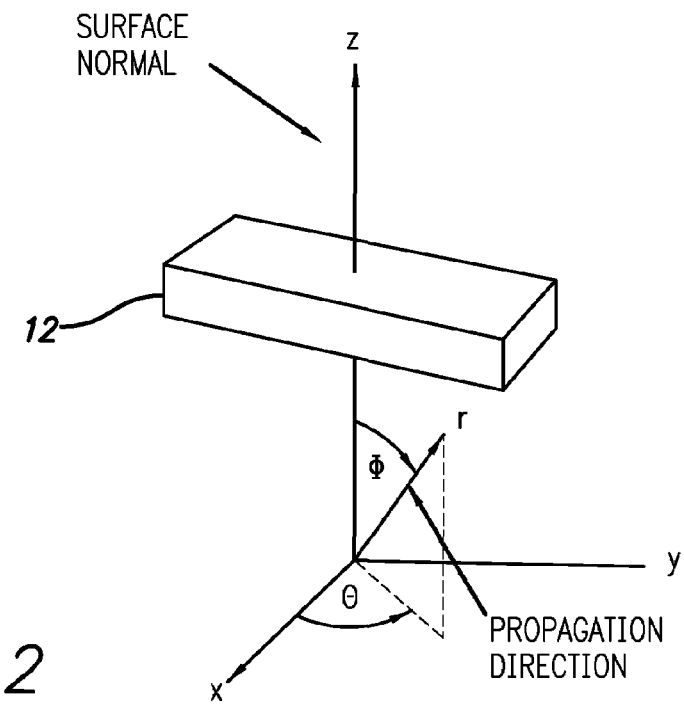
FIG. 2 illustrates a single birefringent stage and a set of reference coordinate axes.

This configuration works best when the incident light is polarized at 45°. As the light refracts through the first layer 16, an OPD is developed between the light propagating along each of two axes, one along and the other orthogonal to the extraordinary axis of the first layer 16. The amount of OPD developed during propagation through this first layer 16 is determined by the depth of the birefringent material. The amount of OPD will also vary with the angle of incidence. Light emerging from the first layer 16 is refracted into the half-wave plate 20, where the phase of light propagating along one of the axes will be changed by 180°. This results in the polarization being rotated by 90°. After emerging from the half-wave plate 20, light passes into the second layer 18 of birefringent material. Again, this second layer 18 preferably is constructed of the same birefringent material as, has the same depth as, and has an extraordinary axis that is orthogonal to the first layer 16 of birefringent material. Therefore, the OPD developed in the second layer 18 is identical to, and effectively doubles, the OPD developed in the first layer 16. The benefit of this configuration is that it creates a condition where the resulting OPD between the two axes is nearly independent of the azimuthal angle, $\phi$. The coordinates are defined as shown in FIG. 2, where the z-axis is normal to the birefringent stage 12, the position vector, r, corresponds to the direction of light propagation, the azimuthal angle, $\phi$, corresponds to the angle of the position vector with respect to the x-axis, and the cone angle, $\theta$, corresponds to the angle of incidence.

Figure 3:
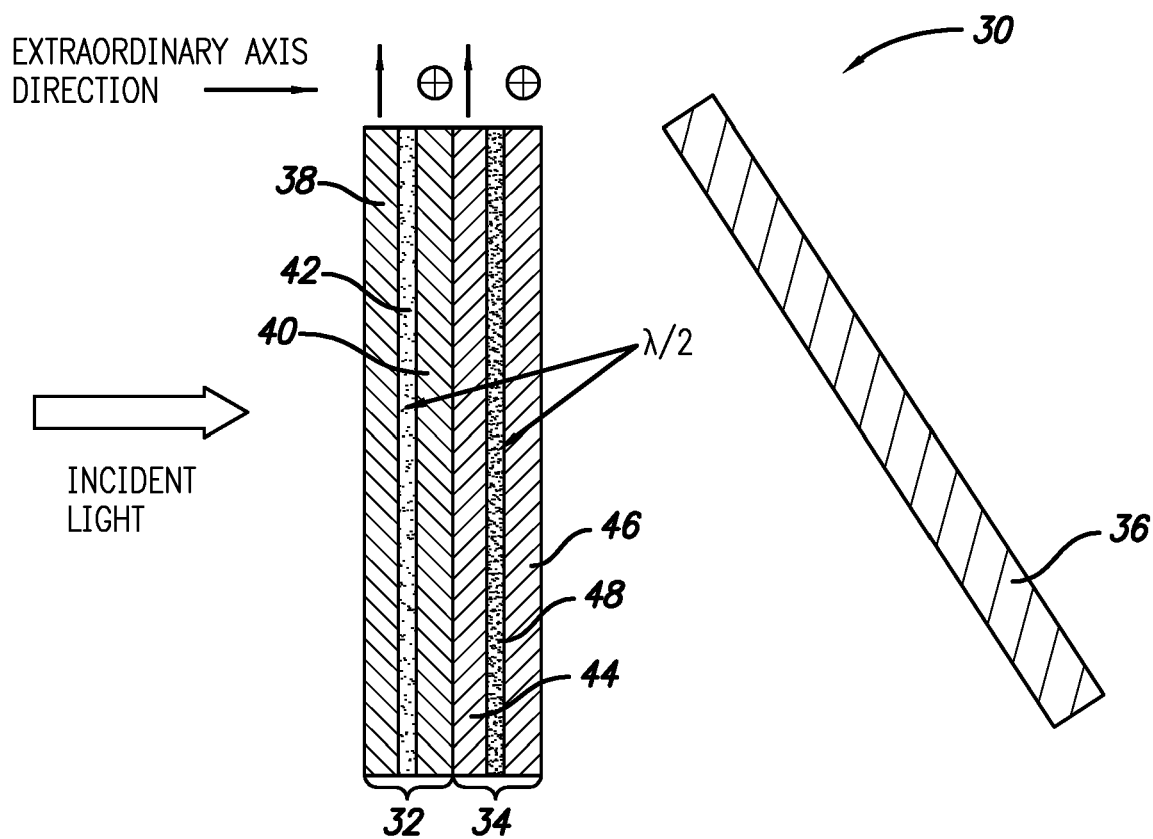
FIG. 3 illustrates a filter with two birefringent stages.

FIG. 3 illustrates a birefringent filter 30 having two birefringent stages 32, 34 and a polarizing beam splitter 36. The first birefringent stage 32 includes two layers 38, 40 of birefringent material, both preferably the same material, separated by a half-wave plate 42. Similarly, the second birefringent stage 34 includes two layers 44, 46 of birefringent material, both preferably the same material that is different from the birefringent material used in the first stage 32, separated by a half-wave plate 48. As described above in reference to FIG. 1, the first birefringent stage 32 is configured to make the OPD independent of the azimuthal angle, $\phi$. The second birefringent stage 34 is configured similar to the first stage 32, except that a different birefringent material, with a different index of refraction, is preferably used for the second stage 34. Further, the birefringent layers 44, 46 of the second stage 34 are configured to have a depth which minimizes the sensitivity of the overall OPD to the angle of incidence, thus effectively enlarging the field-of-view of the filter.

The ability to minimize dependence on the azimuthal angle $\phi$ in FIG. 1 can be understood by expressing the OPD as a Taylor Series expansion in powers of $\sin(\phi)$ for each birefringent layer as follows:

$$OPD_{layer1}=a_0+a_1\cdot\sin(\phi)^2+a_2\cdot\sin(\phi)^4+O(\sin(\phi)^6); \text{ and}$$

$$OPD_{layer2}=b_0+b_1\cdot\cos(\phi)^2+b_2\cdot\cos(\phi)^4+O(\cos(\phi)^6),$$

where each $\cos(\phi)$ in the stage 2 series is the result of the 90° rotation of the polarization at the half-wave plate in the first birefringent layer, and $O(\sin(\phi)^6)$ and $O(\cos(\phi)^6)$ are functions representing the higher order Taylor Series expansion. The total OPD is the sum of the two layer. If the system were designed so that $a_1=b_1$, the dependence on $\phi$ would vanish up to the second order. Even so, the fourth order and higher terms in $\phi$ (which are very small) would remain, each contributing to the overall OPD. Clearly if both layers are substantially equal in thickness and of the same material, then $a_1=b_1$ and the principal source of azimuthal variability will be cancelled.

The ability to minimize dependence on the cone angle in FIG. 3 can be understood by expressing the OPD as a Taylor Series expansion in powers of $\sin(\theta)$ for each birefringent stage as follows:

$$OPD_{stage1}=a_0+a_1\cdot\sin(\theta)^2+a_2\cdot\sin(\theta)^4+O(\sin(\theta)^6); \text{ and}$$

$$OPD_{stage2}=b_0+b_1\cdot\sin(\theta)^2+b_2\cdot\sin(\theta)^4+O(\sin(\theta)^6),$$

where the small amount of remaining anisotropy in the azimuthal angle is ignored. In designing a filter, the sum of the OPD's is designed to be equal to a predetermined value, such as 1 mm, with as little variation as possible across the desired field of view. If both stages are made from the same material, this is impossible because the $a_j$ and $b_j$ coefficients are identical. If the thicknesses and orientation of the extraordinary axes are chosen so that $a_1+b_1=0$, then no OPD will be generated.

If two different birefringent materials are used, each with different optical properties, then the thicknesses and orientation can be chosen so that $a_1+b_1=0$ while retaining a nonzero value for $a_0+b_0$. The two stage filter, as a unit, then has the desired OPD, e.g., 1 mm, while the quadratic dependence on the cone angle is eliminated. The remaining error is proportional to $\sin(\theta)^4$.

The field of view can be increased still further by adding a controlled amount of $\sin(\theta)^2$ variation by setting $a_1-b_1$ to a nonzero value which partially cancels the contribution of the $\sin(\theta)^4$ and other higher terms. Typically this optimization will reduce the maximum OPD error across the field of view by about 8×.

Even further increases can be made in the field of view by adding a third or fourth stage. Each successive stage of a different birefringent material will allow cancellation of another order of $\sin(\theta)^2$. Thus three stages, if appropriately configured, will allow complete cancellation of $\sin(\theta)^2$ and $\sin(\theta)^4$, although the optimal design would adjust these layer thicknesses to cancel large portions of the higher order sin terms as well.

Figure 4A:
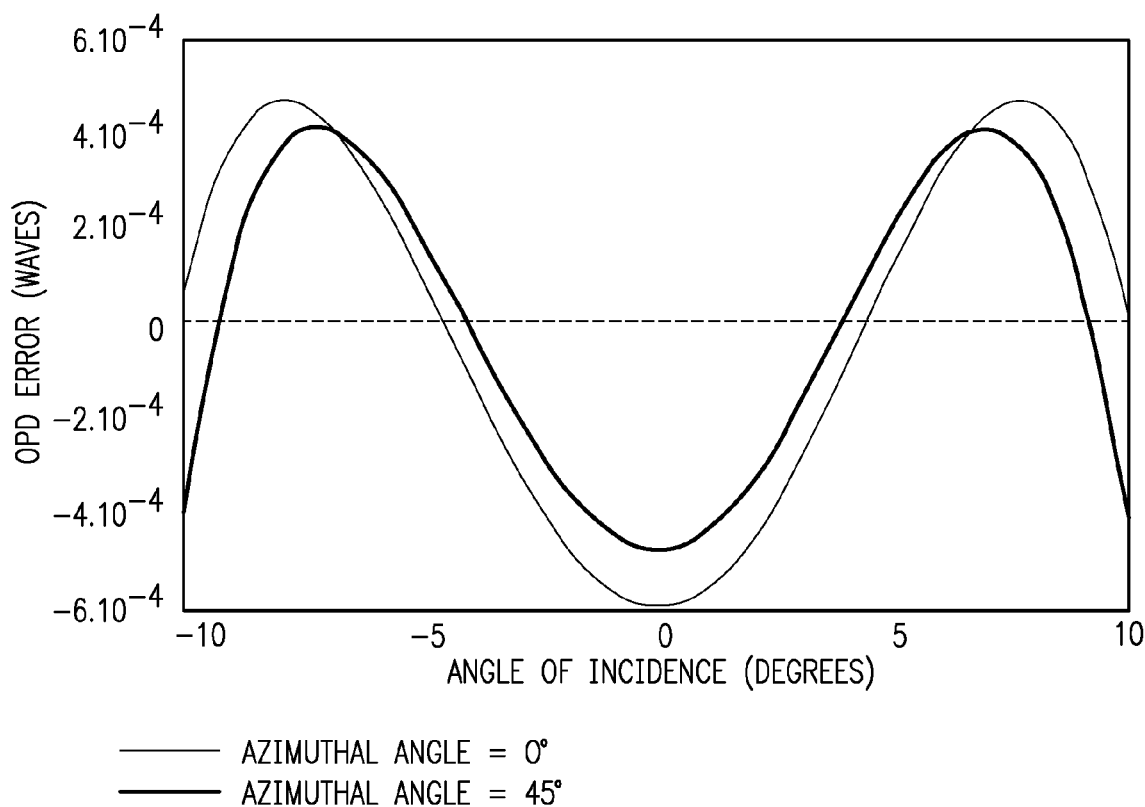
FIG. 4A is a chart illustrating the optical path difference generated by a birefringent filter over a $\pm 10°$ angle of incidence.
Figure 4B:
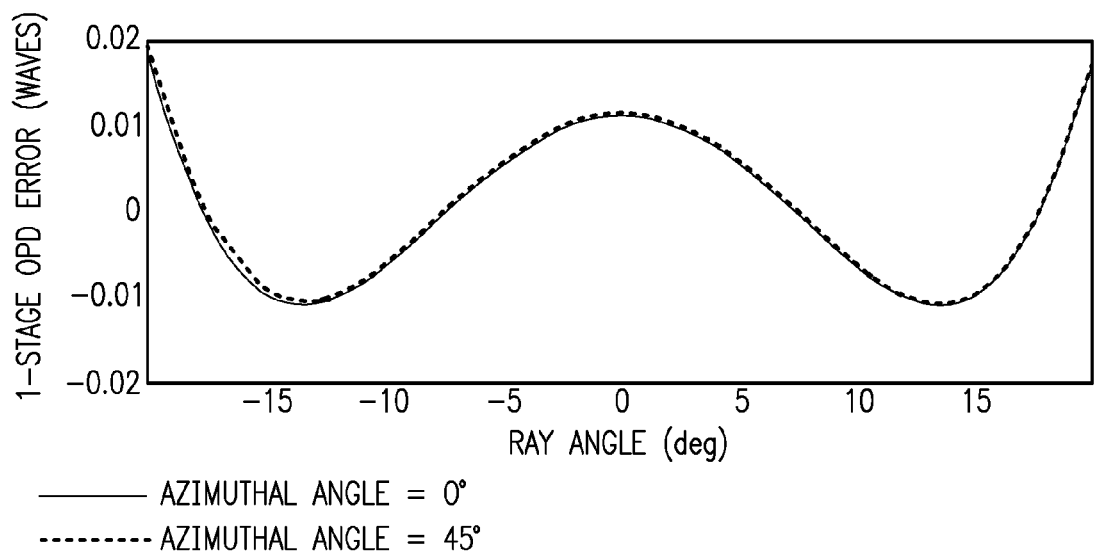
FIG. 4B is a chart illustrating the optical path difference generated by a birefringent filter over a $\pm 20°$ angle of incidence.

FIG. 4A compares the variation in the OPD of an optimized birefringent filter composed of two materials for two azimuthal angles, $\phi=0$ and $\phi=45'$, over an angle of incidence range of $-10°<\theta<10°$. The error in the OPD is held to a very small fraction of a wave over the 20° field-of-view. FIG. 4B compares the variation in the OPD of the same birefringent filter over an angle of incidence range $-20°<\theta<20°$.

Figure 5A:
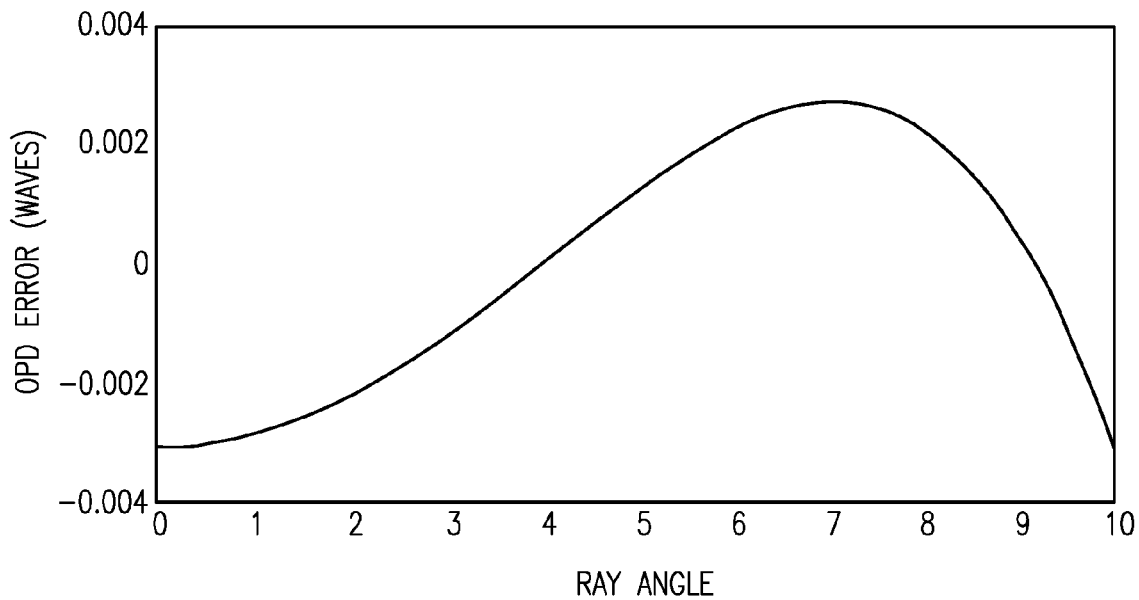
FIG. 5A is a chart illustrating the optical path difference error generated by a birefringent hyper-spectral filter over a $10°$ angle of incidence.
Figure 5B:
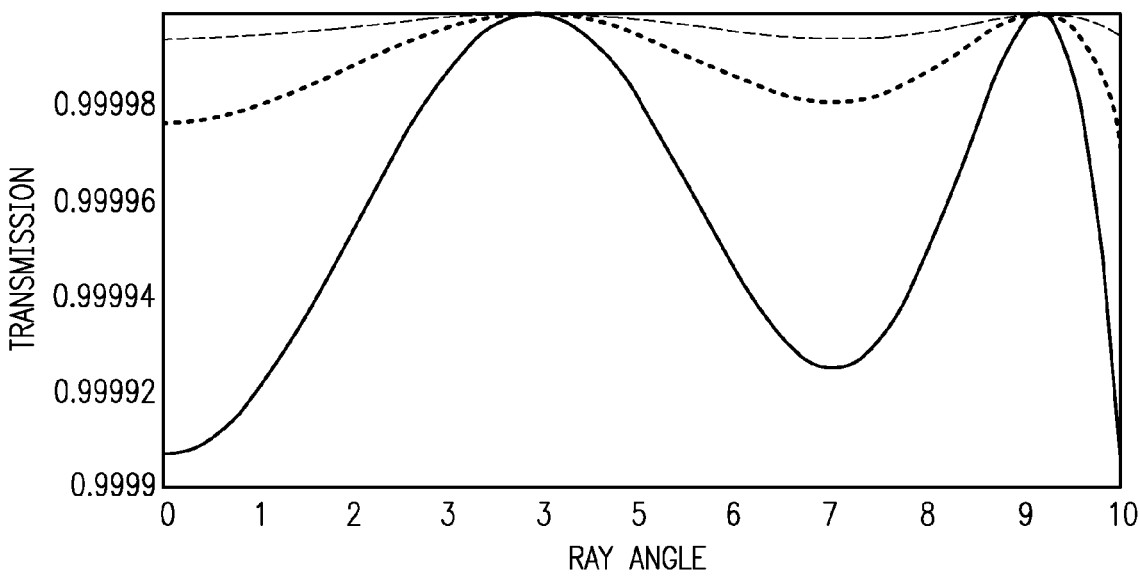
FIG. 5B is a chart illustrating light transmission through a birefringent hyper-spectral filter over a $\pm 10°$ angle of incidence.
Figure 5C:
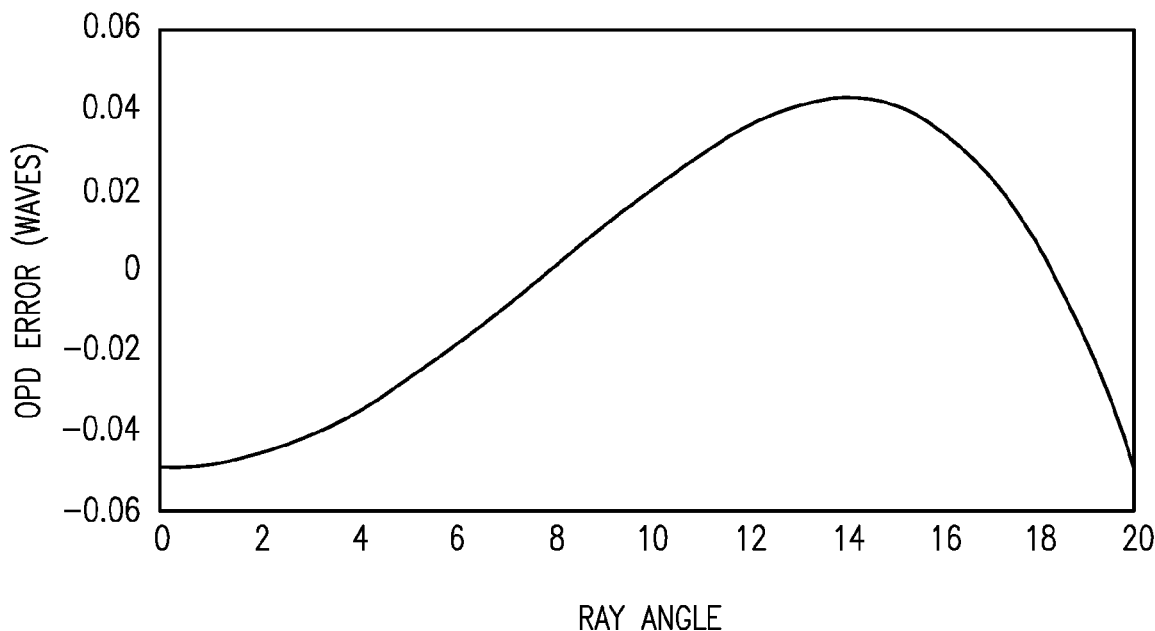
FIG. 5C is a chart illustrating the optical path difference error generated by a birefringent hyper-spectral filter over a $\pm 20°$ angle of incidence.
Figure 5D:
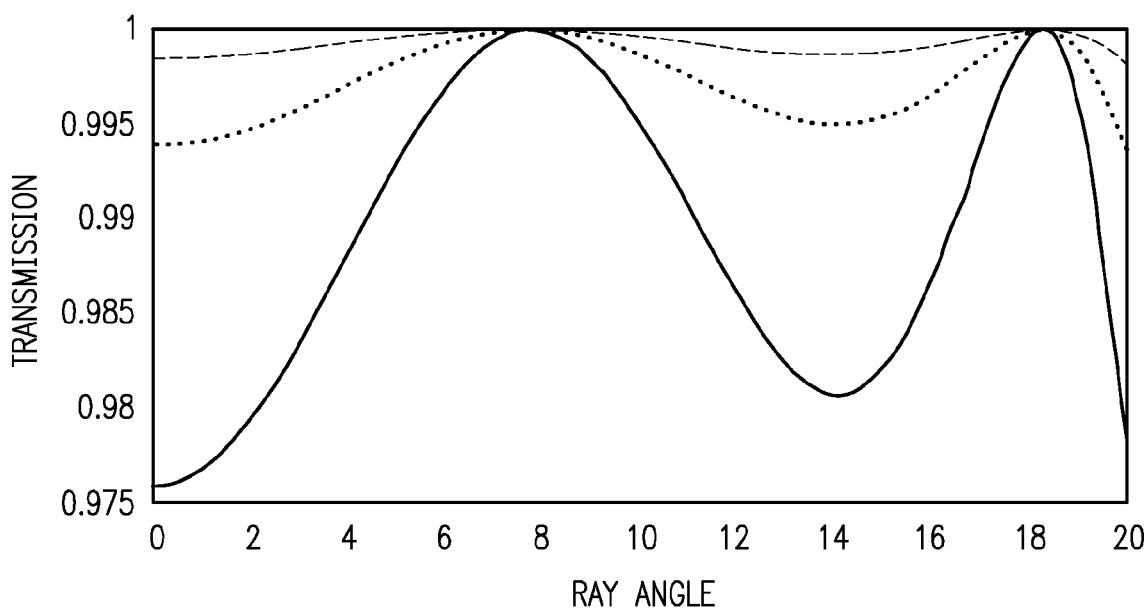
FIG. 5D is a chart illustrating light transmission through a birefringent hyper-spectral filter over a $\pm 20°$ angle of incidence.

Errors in the OPD of the filter across the field of view affect the transmission of the filter proportional to $[1+\cos(2\pi OPD/\lambda)]/2$. FIGS. 5A and 5B illustrate the OPD error and light transmission through a birefringent hyper-spectral filter over an angle of incidence range of $0°<\phi<10°$. A three stage hyper-spectral filter, constructed using three birefringent filters using the same type of configuration that is disclosed in U.S. Pat. No. 6,580,509, the disclosure of which is incorporated herein by reference, was simulated to create these charts, where each stage was simulated with $LiNbO_3$ and $YVO_4$ as the birefringent layers in each of the first and second stages, respectively. Other known birefringent materials, such as Calcite, $TeO_2$, $PbMoO_4$, and the like, may also be used for the birefringent layers. The same three stage filter configuration was used to generate the charts of FIGS. 5C and 5D, which illustrate the OPD error and light transmission through a birefringent hyper-spectral filter over an angle of incidence range of $0°<\phi<20°$. Depending upon the materials chosen and the needs of the application, the birefringent hyper-spectral filter may be advantageously used for angles of incidence that are greater than 20°.

One advantage of the birefringent hyper-spectral filter is that it can be made more compact than currently known hyper-spectral filters. For example, the hyper-spectral filter discussed in U.S. Pat. No. 6,580,509 requires a volume of $3D^3$ for each filter stage, where D represents the beam diameter of light emerging from a single filter. In contrast, a single birefringent hyper-spectral filter can be constructed with a volume of $D^3$. In addition, a birefringent hyper-spectral filter can also be made lighter because of the materials that may be used. Moreover, because a birefringent hyper-spectral filter uses transmissive materials, as opposed to the reflective materials, fewer alignment issues arise during assembly.

Figure 6:
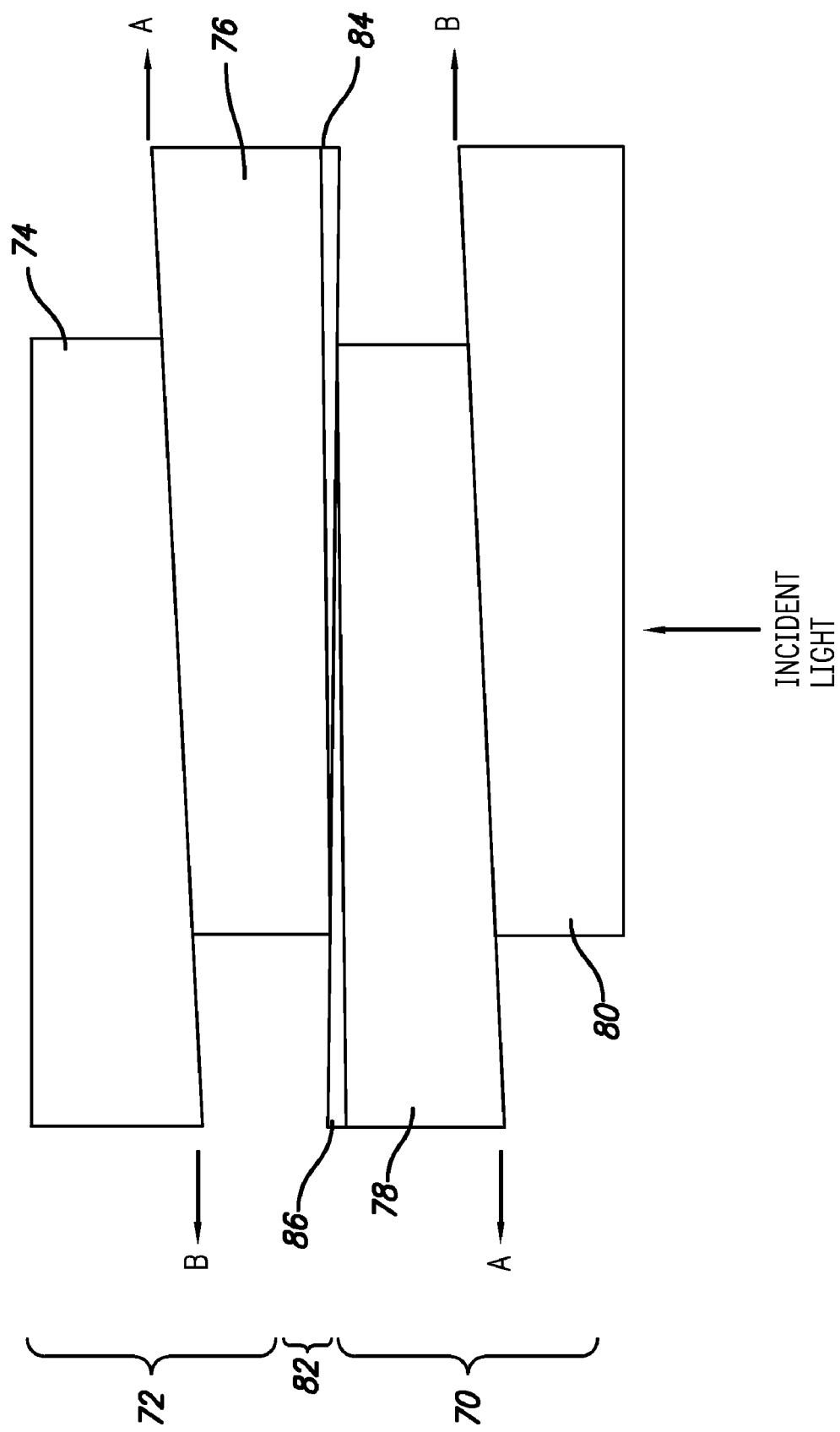
FIG. 6 illustrates two birefringent stages of a birefringent filter, each stage having birefringent layers with adjustable thicknesses.

FIG. 6 illustrates a configuration for the birefringent and half-wave plate layers in a birefringent filter which enables the depths of the layers to be tuned for a desired wavelength once the filter is deployed. Each birefringent layer 70, 72 includes a pair of wedge-shaped layers 74, 76, 78, 80 having the angled sides facing each other. The half-wave plate 82 is disposed between the inner wedge-shaped layers 76, 78 and also includes a pair of wedge-shaped layers 84, 86, each respectively attached to the inner wedge-shaped layers 76, 78 of the birefringent layers 70, 72. The overall depth of the half-wave plate 82 and each birefringent layer 70, 72 is controlled by lateral movement of the individual wedge-shaped layers. For example, by moving the inner wedge-shaped layers 76, 78 in the directions indicated by the arrows marked 'A', the depth of the half-wave plate 82 is decreased. Movement of these layers 76, 78 in the opposite direction increases the depth of the half-wave plate 82. After the depth of the half-wave plate 82 is tuned to a desired wavelength, then the depth of the birefringent layers 70, 72 may be tuned accordingly. The depth of the birefringent layers 70, 72 is reduced by moving the outer wedge-shaped layers 74, 80 in the directions indicated by the arrows marked 'B'. Movement of these layers 74, 80 in the opposite direction increases the depth of the birefringent layers 70, 72.

The angle of the wedge in each wedge-shaped layer can be fairly small to adjust the overall OPD. With a small angle, the amount of wedge movement required to adjust the OPD is much larger and the filter can be easily tuned. Alternatively, the angle of the wedges can also be made larger so that the wavelength can be tuned continuously across a larger range.

Thus, a birefringent hyper-spectral filter is disclosed, one which can produce consistent desired OPDs over large variations in angle of incidence, regardless of the azimuthal angle. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A birefringent spectral filter comprising:
   a first birefringent stage adapted to generate an optical path difference (OPD) between two polarizations of incident light propagating along each of two orthogonal axes, respectively, the first birefringent stage comprising:
   a first layer of a first birefringent material having a first depth and a first extraordinary axis aligned with a first of the two orthogonal axes;
   a second layer of the first birefringent material having the first depth and a second extraordinary axis, the second extraordinary axis being orthogonal to the first extraordinary axis; and
   a first half-wave plate disposed between the first and second layers of birefringent material;
   a third layer of a second birefringent material optically coupled to the first birefringent stage, the third layer having a second depth and a third extraordinary axis aligned with one of the two orthogonal axes; and
   a fourth layer of the second birefringent material optically coupled to the third layer of birefringent material, the fourth layer having the second depth and a fourth extraordinary axis, the fourth extraordinary axis being orthogonal to the third extraordinary axis, wherein
   the second birefringent material is different from the first birefringent material,
   the third and fourth layers are adapted to generate a further OPD between the two polarizations of incident light, and
   the second depth is different from the first depth and is adapted to enlarge a field of view by controlling an amount of contribution to the total OPD from second and higher orders of the sine of a cone angle, $\theta$, of light incident upon the filter; and
   a polarizing beam splitter optically coupled to the first birefringent stage.

2. The filter of claim 1, wherein each of the first and second layers comprises a pair of wedge-shaped layers.

3. The filter of claim 2, wherein each layer within each pair of wedge-shaped layers is movable in a direction which is perpendicular to an optical axis of the first birefringent stage.

4. The filter of claim 1, wherein the first half-wave plate comprises a pair of wedge-shaped layers.

5. The filter of claim 4, wherein each layer within the pair of wedge-shaped layers is movable in a direction which is perpendicular to an optical axis of the first birefringent stage.

6. The filter of claim 1, wherein the third and fourth layers are optically coupled between the first birefringent stage and the polarizing beam splitter.

7. The filter of claim 6, further comprising:
   a second half-wave plate disposed between the third and fourth layers.

8. The filter of claim 7, wherein the second half-wave plate comprises a pair of wedge-shaped layers.

9. The filter of claim 8, wherein each layer within the pair of wedge-shaped layers is movable in a direction which is perpendicular to an optical axis of the first birefringent stage.

10. The filter of claim 1, wherein each of the third and fourth layers comprises a pair of wedge-shaped layers.

11. The filter of claim 10, wherein each layer within each pair of wedge-shaped layers is movable in a direction which is perpendicular to an optical axis of the first birefringent stage.

12. The filter of claim 1, wherein the third and fourth layers are optically coupled on opposite sides of the first half wave plate.

13. A birefringent spectral filter comprising:
    a first multi-layer birefringent stage including two first stage layers of a first birefringent material, the two first stage layers having first orthogonal extraordinary axes and each having a first depth, the first birefringent stage being adapted to generate an optical path difference (OPD) between two polarizations of incident light propagating along each of two orthogonal axes, respectively;
    a second multi-layer birefringent stage optically coupled to the first birefringent stage, the second birefringent stage including two second stage layers of a second birefringent material, different from the first birefringent material, the two second stage layers having second orthogonal extraordinary axes, each of the second pair of extraordinary axes being parallel to one of the first pair of extraordinary axes, and each second stage layer having a second depth, the second birefringent stage being adapted to generate a further OPD between the two polarizations of incident light, wherein the second depth is different from the first depth and the further OPD is nearly independent is adapted to enlarge a field of view by controlling an amount of contribution to the total OPD from second and higher orders of the sine of a cone angle, $\theta$, of light incident upon the filter; and
    a polarizing beam splitter optically coupled to the second birefringent stage.

14. The filter of claim 13 wherein the first birefringent stage further includes
    a half-wave plate disposed between the two first stage layers of the first birefringent material.

15. The filter of claim 13, wherein each of the two first stage layers comprises a pair of wedge-shaped layers.

16. The filter of claim 15, wherein each layer within each pair of wedge-shaped layers is movable in a direction which is perpendicular to an optical axis of the second birefringent stage.

17. The filter of claim 14, wherein the half-wave plate comprises a pair of wedge-shaped layers.

18. The filter of claim 17, wherein each layer within the pair of wedge-shaped layers is movable in a direction which is perpendicular to an optical axis of the second birefringent stage.

19. The filter of claim 13, wherein the second birefringent stage further includes
a half-wave plate disposed between the two second stage layers of the second birefringent material.

20. The filter of claim 19, wherein the half-wave plate comprises a pair of wedge-shaped layers.

21. The filter of claim 20, wherein each layer within the pair of wedge-shaped layers is movable in a direction which is perpendicular to an optical axis of the second birefringent stage.

22. The filter of claim 13, wherein each of the two second stage layers comprises a pair of wedge-shaped layers.

23. The filter of claim 22, wherein each layer within each pair of wedge-shaped layers is movable in a direction which is perpendicular to an optical axis of the second birefringent stage.

24. A birefringent spectral filter comprising:
a first birefringent stage adapted to generate an optical path difference (OPD) between two polarizations of incident light propagating along each of two orthogonal axes, respectively, the first birefringent stage comprising:
a first layer of a first birefringent material having a first depth;
a second layer of the first birefringent material having the first depth, wherein the first and second layers of the first birefringent material have orthogonally aligned extraordinary axes; and
a first half-wave plate disposed between the first and second layers of the first birefringent material;
a second birefringent stage optically coupled to the first birefringent stage and adapted to generate a further OPD between the two polarizations of incident light the second birefringent stage comprising:
a first layer of a second birefringent material having a second depth;
a second layer of the second birefringent material having the second depth, wherein the first and second layers of the second birefringent material have orthogonally aligned extraordinary axes, each of which is parallel to one of the extraordinary axes in the first birefringent stage, and the second birefringent material is different from the first birefringent material; and
a second half-wave plate disposed between the first and second layers of the second birefringent material, wherein the second depth is different from the first depth and is adapted to enlarge a field of view by controlling an amount of contribution to the total OPD from second and higher orders of the sine of a cone, θ, of light incident upon the filter; and
a polarizing beam splitter optically coupled to the second birefringent stage.

25. The filter of claim 24, wherein each of the first and second layers of the first birefringent material comprises a pair of wedge-shaped layers of the first birefringent material.

26. The filter of claim 25, wherein each layer within each pair of wedge-shaped layers is movable in a direction which is perpendicular to an optical axis of the first birefringent stage.

27. The filter of claim 24, wherein the first half-wave plate comprises a pair of wedge-shaped layers.

28. The filter of claim 27, wherein each layer within the pair of wedge-shaped layers is movable in a direction which is perpendicular to an optical axis of the first birefringent stage.

29. The filter of claim 24, wherein each of the first and second layers of the second birefringent material comprises a pair of wedge-shaped layers of the second birefringent material.

30. The filter of claim 29, wherein each layer within each pair of wedge-shaped layers is movable in a direction which is perpendicular to an optical axis of the second birefringent stage.

31. The filter of claim 24, wherein the second half-wave plate comprises a pair of wedge-shaped layers.

32. The filter of claim 31, wherein each layer within the pair of wedge-shaped layers is movable in a direction which is perpendicular to an optical axis of the second birefringent stage.

33. A wide field of view birefringent phase retarder comprising:
a first birefringent stage adapted to generate an optical path difference (OPD) between two polarizations of incident light propagating along each of two orthogonal axes, respectively, the first birefringent stage comprising:
a first layer of a first birefringent material having a first depth and a first extraordinary axis aligned with a first of the two orthogonal axes;
a second layer of the first birefringent material having the first depth and a second extraordinary axis, the second extraordinary axis being orthogonal to the first extraordinary axis; and
a first half-wave plate disposed between the first and second layers of birefringent material;
a third layer of a second birefringent material optically coupled to the first birefringent stage, the third layer having a second depth and a third extraordinary axis aligned with one of the two orthogonal axes; and
a fourth layer of the second birefringent material optically coupled to the third layer of birefringent material, the fourth layer having the second depth and a fourth extraordinary axis, the fourth extraordinary axis being orthogonal to the third extraordinary axis, wherein
the second birefringent material is different from the first birefringent material,
the third and fourth layers are adapted generate a further OPD between the two polarizations of incident light, and
the second depth is different from the first depth and is adapted to enlarge a field of view by controlling an amount of contribution to the total OPD from second and higher orders of the sine of a cone angle, θ, of incident light of light.

34. A wide field of view birefringent phase retarder comprising:
a first birefringent stage adapted to generate an optical path difference (OPD) between two polarizations of incident light propagating along each of two orthogonal axes, respectively, the first birefringent stage comprising:
a first layer of a first birefringent material having a first depth;
a second layer of the first birefringent material having the first depth, wherein the first and second layers of the first birefringent material have orthogonally aligned extraordinary axes; and a first half-wave plate disposed between the first and second layers of the first birefringent material;

a second birefringent stage optically coupled to the first birefringent stage and adapted to generate a further OPD between the two polarizations of incident light, the second birefringent stage comprising:

a first layer of a second birefringent material having a second depth;

a second layer of the second birefringent material having the second depth, wherein the first and second layers of the second birefringent material have orthogonally aligned extraordinary axes, each of which is parallel to one of the extraordinary axes in the first birefringent stage, and the second birefringent material is different from the first birefringent material; and a second half-wave plate disposed between the first and second layers of the second birefringent material, wherein the second depth is different from the first depth and is adapted to enlarge a field of view by controlling an amount of contribution to the total OPD from second and higher orders of the sine of a cone angle, $\theta$, of the incident light.

* * * * *